(12) United States Patent
Kubitza et al.

(10) Patent No.: US 11,828,429 B2
(45) Date of Patent: Nov. 28, 2023

(54) LIGHT SOURCE MODULE WITH LIGHT SOURCES AND TEMPERATURE SENSORS DISPOSED ON A SUBSTRATE

(71) Applicant: HELLA GmbH & Co. KG, Lippstadt (DE)

(72) Inventors: Boris Kubitza, Moehnesee-Koerbecke (DE); Martin Pluempe, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/842,987

(22) Filed: Jun. 17, 2022

(65) Prior Publication Data

US 2022/0316675 A1 Oct. 6, 2022

Related U.S. Application Data

(63) Continuation of application No. PCT/EP2020/085056, filed on Dec. 8, 2020.

(30) Foreign Application Priority Data

Dec. 19, 2019 (DE) .................. 10 2019 135 234.7

(51) Int. Cl.
*F21S 41/153* (2018.01)
*F21S 45/10* (2018.01)

(52) U.S. Cl.
CPC ............ *F21S 41/153* (2018.01); *F21S 45/10* (2018.01)

(58) Field of Classification Search
CPC ...... F21S 41/153; F21S 45/10; F21Y 2105/00; F21Y 2105/10; F21Y 2105/12; F21Y 2105/14; F21Y 2105/16; F21Y 2105/18
See application file for complete search history.

(56) References Cited

U.S. PATENT DOCUMENTS

| 8,039,785 B2 * | 10/2011 | Olson .................. H05B 45/46 250/339.04 |
| 10,237,940 B2 | 3/2019 | Pelz et al. |
| 10,820,390 B2 | 10/2020 | Baumheinrich et al. |
| 2011/0012514 A1 | 1/2011 | Olson et al. |

FOREIGN PATENT DOCUMENTS

| DE | 102017131229 A1 | 6/2018 |
| DE | 102017105131 A1 | 9/2018 |

OTHER PUBLICATIONS

International Search Report dated Mar. 18, 2021 in corresponding application PCT/EP2020/085056.

* cited by examiner

*Primary Examiner* — Robert J May
(74) *Attorney, Agent, or Firm* — Muncy, Geissler, Olds & Lowe, P.C.

(57) ABSTRACT

A light source module for a motor vehicle, comprising a substrate, multiple light sources, and temperature sensors, wherein the light sources and the temperature sensors are arranged on the substrate, wherein the substrate has a central region and a peripheral region, and wherein the number of temperature sensors per unit area is greater in the central region than in the peripheral region.

12 Claims, 3 Drawing Sheets

LIGHT SOURCE MODULE WITH LIGHT SOURCES AND TEMPERATURE SENSORS DISPOSED ON A SUBSTRATE

This nonprovisional application is a continuation of International Application No. PCT/EP2020/085056, which was filed on Dec. 8, 2020, and which claims priority to German Patent Application No. 10 2019 135 234.7, which was filed in Germany on Dec. 19, 2019, and which are both herein incorporated by reference.

BACKGROUND OF THE INVENTION

Field of the Invention

The present invention relates to a light source module for a motor vehicle.

Description of the Background Art

Light source modules with a matrix of light-emitting diodes are state of the art in the automotive sector. They are often used in a headlight designed to illuminate a roadway in front of the motor vehicle.

The heat arising during operation of the light source module is monitored. If necessary, the output of the light source module can be reduced if it becomes too hot and there is a risk of damage or impairment of the service life.

DE 10 2017 131 229 A1, which corresponds to US 2018/0184495, discloses temperature sensors for this purpose, each of which determines the actual temperature for a group of light-emitting diodes. If the temperature is too high, the output of the respective group is reduced so that the light-emitting diodes cool down.

SUMMARY OF THE INVENTION

It is therefore an object of the present invention to optimize the distribution of the temperature sensors. In addition, a motor vehicle with a light source module of this kind is to be created.

The light source module comprises a substrate, multiple light sources, and temperature sensors. The light sources and the temperature sensors are arranged on the substrate. The substrate has a central region and a peripheral region. The central region can be surrounded, for example, by the peripheral region. The peripheral region can comprise, for example, edge regions of the substrate.

The number of temperature sensors per unit area is greater in this case in the central region than in the peripheral region. The number of temperature sensors is understood to be a measure of the temperature sensor density. The higher the number, the more densely the temperature sensors are arranged in the respective region. Thus, for example, more temperature sensors can be arranged per square centimeter in the central region than in the peripheral region.

It is particularly advantageous to have more temperature sensors per unit area in the central region, because more heat is generated here during normal operation of the light source module than in the peripheral region. In addition, larger temperature differences can occur in the central region than in the peripheral region. The invention thus enables particularly precise temperature measurement where particularly large amounts of heat are generated and particularly large temperature differences occur, whereas fewer temperature sensors are used in a region where less heat is generated and smaller temperature differences occur. Thus, compared to the state of the art, the number of temperature sensors does not necessarily have to be increased in order to obtain more accurate measurement results in the central region. The fact that the measurement results are then less accurate in the peripheral region is not a major disadvantage, because less heat is generated here and the temperature differences are smaller.

The light sources can be designed as light-emitting diodes or laser diodes, wherein the light-emitting diodes or laser diodes can be arranged in a matrix. In particular, the light-emitting diodes can be integrated into a solid-state LED array. Like the temperature sensors, light-emitting diodes can be arranged particularly easily as semiconductor elements on the substrate.

The number of light sources per unit area can be constant. This is advantageous for a uniform light distribution.

The number of temperature sensors per unit area can be greater in the central region than in the peripheral region due to a greater number of temperature sensors per unit length in exactly one single first dimension in the central region. This can be a series of temperature sensors, for example, if the temperature sensors are arranged distributed exclusively in the first dimension.

The temperature sensors can be arranged both in the first dimension and in a second dimension. Thus, for example, there can be multiple rows, running parallel to one another, in which the temperature sensors are arranged.

The first dimension can extend perpendicular to the second dimension.

The number of temperature sensors per unit length in the second dimension can be constant.

The number of temperature sensors per unit length in the first dimension can have a Gaussian distribution. In the context of this description, this is also understood to mean, in particular, a distribution approximating a Gaussian distribution. Because, of course, only intact temperature sensors are used, this can be, in particular, a discrete distribution approximating a Gaussian distribution. A particularly good relationship between the number of temperature sensors used and the precision of the measured values is achieved by such a Gaussian distribution.

The number of temperature sensors per unit area can be greater in the central region than in the peripheral region due to a greater number of temperature sensors per unit length in a first and in a second dimension.

The number of temperature sensors per unit length both in the first and in the second dimension can have a Gaussian distribution.

The first dimension can extend perpendicular to the second dimension.

The light sources can be designed to emit light visible to the human eye. In the context of this description, this refers in particular to electromagnetic radiation with a wavelength between 380 nm and 780 nm.

Also, a motor vehicle is provided that comprises a light module according to the invention. The light module, for example, as part of a headlight, is designed to illuminate a roadway in front of the motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
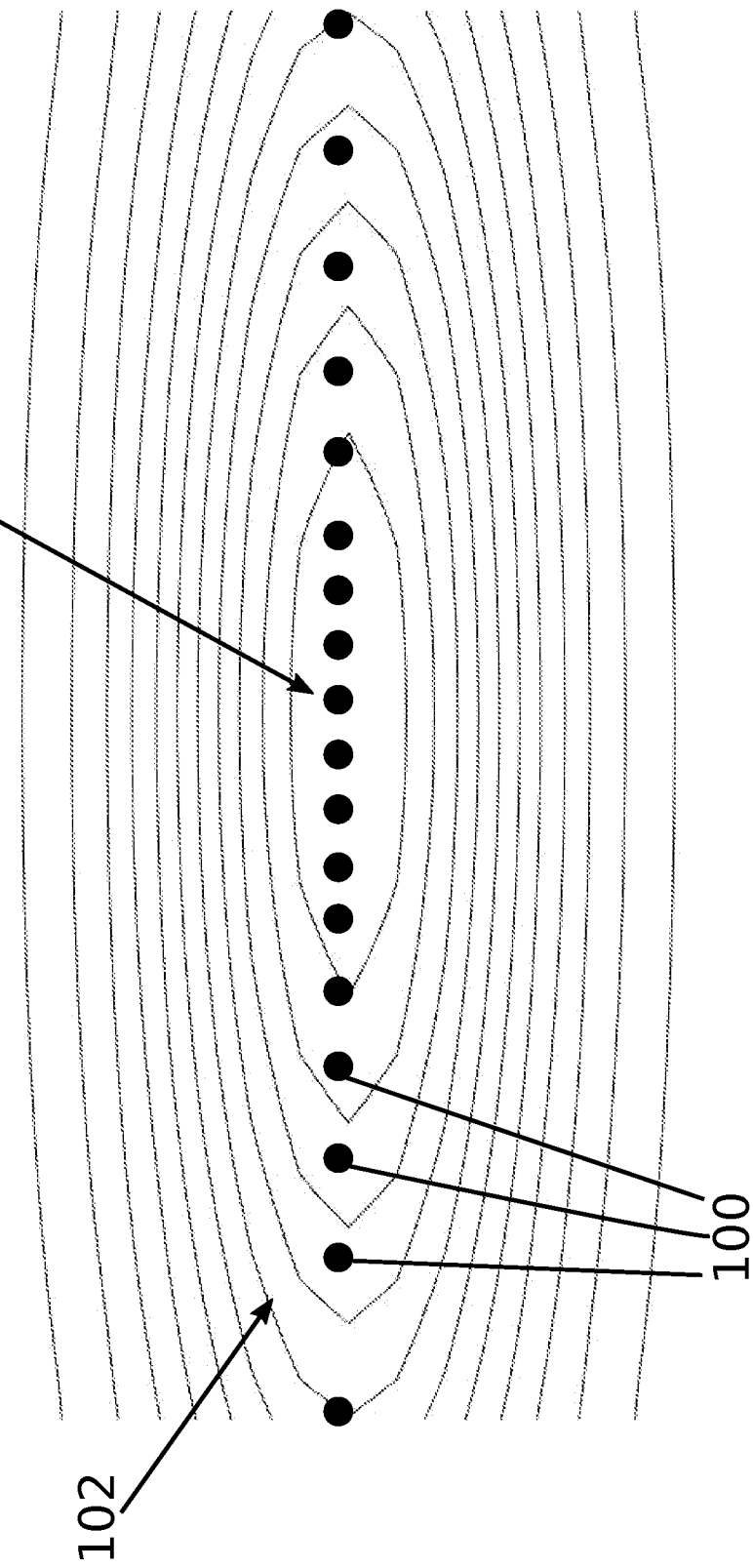
FIG. 1 shows a schematic representation of a temperature distribution on a substrate with temperature sensors arranged on the substrate in a single dimension.

The temperature distribution shown in the figures is represented by black lines, by which regions having a different temperature are represented. This is a highly simplified representation, because continuous temperature distributions occur in practice. In addition, multiple temperature sensors 100 are represented by black dots in the figures. However, for the sake of clarity, only three of these temperature sensors 100 are provided with a reference character in each case.

In FIG. 1, temperature sensors 100 are arranged in a single dimension. Thus, this is a single row of temperature sensors 100. This is the simplest case. The number of temperature sensors 100 per unit length is greater in central region 101 than in peripheral region 102. Because the temperature sensors are arranged in only a single dimension, this is equivalent to the number of temperature sensors 100 per unit area also being greater in central region 101 than in peripheral region 102. Higher temperatures and larger temperature differences are usually reached during operation in central region 101 than in peripheral region 102. Due to the larger number of temperature sensors 100 per unit area in central region 101, precise measurement results can be obtained here, so that the operation of the light-emitting diodes in this region can be adjusted particularly well to the heat generated. Such a good adjustment is usually not necessary in peripheral region 102.

Figure 2:
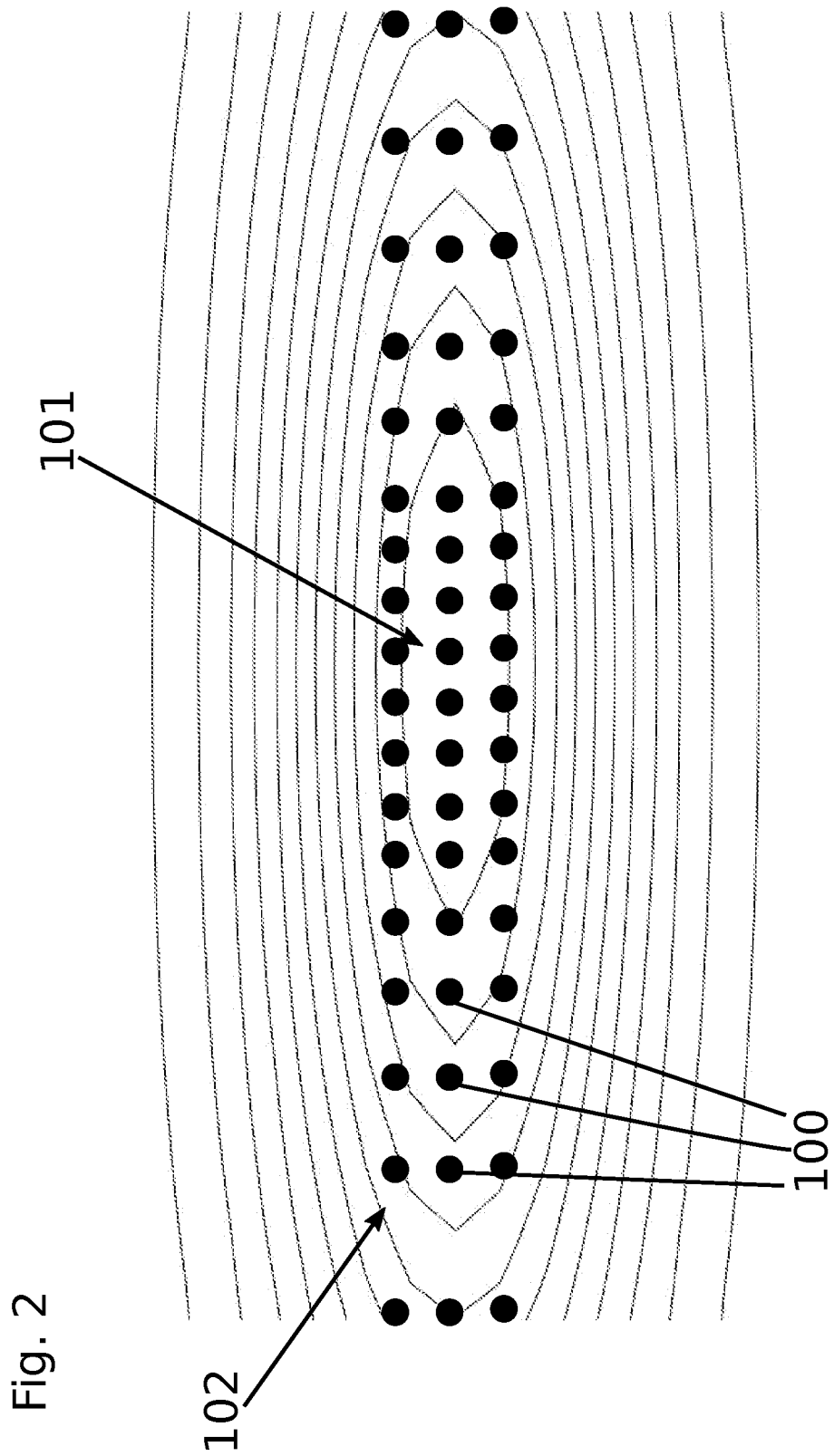
FIG. 2 shows a schematic representation of a temperature distribution on a substrate with temperature sensors arranged on the substrate in two dimensions.

In FIG. 2, temperature sensors 100 are arranged in the first and a second dimension. In this case, the second dimension extends perpendicular to the first dimension. Thus, these are multiple parallel rows of temperature sensors 100. In each of the rows, the number of temperature sensors per unit length in the first dimension is greater in central region 101 than in peripheral region 102. In the second dimension, however, the number of temperature sensors 100 per unit length is constant. This arrangement also achieves the advantage that the operation of the light-emitting diodes in central region 101 can be adjusted particularly well to the heat generated, whereas the required number of temperature sensors 100 is kept small.

Figure 3:
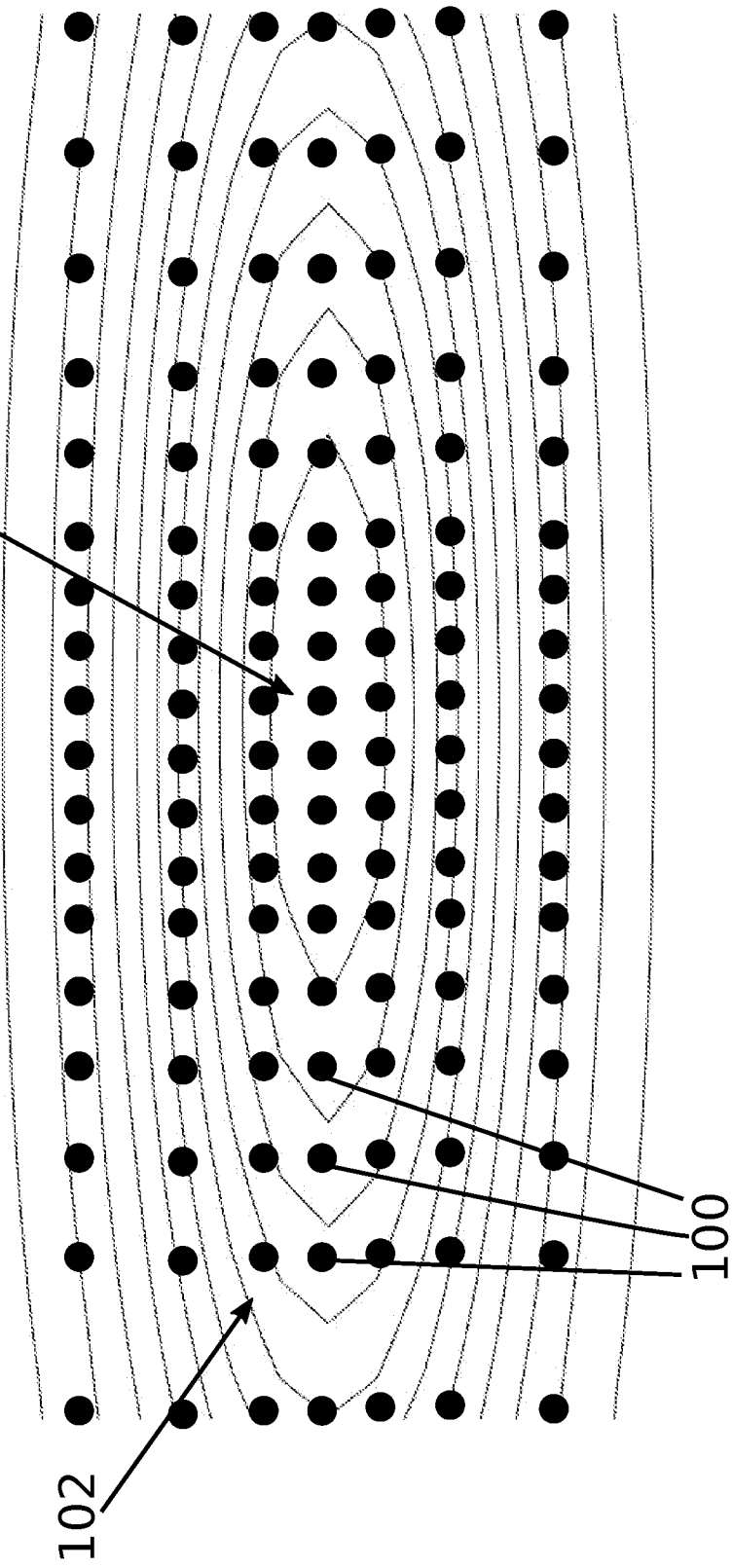
FIG. 3 shows a schematic representation of a temperature distribution on a substrate with temperature sensors arranged on the substrate in two dimensions.

The arrangement of temperature sensors 100 in FIG. 3 differs in particular from the arrangement in FIG. 2 in that the number of temperature sensors per unit length in the second dimension is greater in central region 101 than in peripheral region 102. This arrangement also achieves the advantage that the operation of the light-emitting diodes in central region 101 can be adjusted particularly well to the heat generated, whereas the required number of temperature sensors 100 is kept small.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A light source module for a motor vehicle, the light source module comprising:
   a substrate;
   light sources; and
   temperature sensors,
   wherein the light sources and the temperature sensors are arranged on the substrate,
   wherein the substrate has a central region and a peripheral region,
   wherein a number of the temperature sensors per unit area is greater in the central region than in the peripheral region, and
   wherein in a first row of the temperature sensors, the first row extending linearly in a first direction with some of the temperature sensors located in the central region and some of the temperature sensors located in the peripheral region, a greater number of the temperature sensors per unit length of the first row are located in the central region than in the peripheral region.

2. The light source module according to claim 1, wherein the light sources are designed as light-emitting diodes or laser diodes, wherein the light-emitting diodes or laser diodes are arranged in a matrix, and wherein the light emitting diodes are integrated into a solid-state LED array.

3. The light source module according to claim 1, wherein a number of the light sources per unit area is constant.

4. The light source module according to claim 1, wherein the temperature sensors are arranged both in the first dimension and in a second dimension.

5. The light source module according to claim 4, wherein the first dimension extends substantially perpendicular to the second dimension.

6. The light source module according to claim 4, wherein the number of the temperature sensors per unit length in the second dimension is constant, such that in a first column of the temperature sensors, the first column extending linearly in the second direction with some of the temperature sensors located in the central region and some of the temperature sensors located in the peripheral region, the temperature sensors per unit length along the first column is constant.

7. The light source module according to claim 4, wherein the number of the temperature sensors per unit area is greater in the central region than in the peripheral region due to a greater number of the temperature sensors being provided per unit length in the first dimension and in the second dimension in the central region, such that in a first column of the temperature sensors, the first column extending linearly in the second direction with some of the temperature sensors located in the central region and some of the temperature sensors located in the peripheral region, a greater number of the temperature sensors per unit length of the first column are located in the central region than in the peripheral region.

8. The light source module according to claim 7, wherein the number of the temperature sensors per unit length both in the first dimension and in the second dimension has a Gaussian distribution.

9. The light source module according to claim 7, wherein the first dimension extends substantially perpendicular to the second dimension.

10. The light source module according to claim 1, wherein the number of temperature sensors per unit length in the first dimension has a Gaussian distribution.

11. The light source module according to claim 1, wherein the light sources emit light visible to the human eye.

12. A motor vehicle comprising the light module according to claim 1, wherein the light module illuminates a roadway in front of the motor vehicle.

* * * * *